July 29, 1952

E. J. HAUBER 2,604,788

CLUTCH MECHANISM

Filed Jan. 10, 1947

INVENTOR.
ERWIN J. HAUBER
BY
ATTORNEY

FIG. 8

INVENTOR.
ERWIN J. HAUBER
BY
*M. A. Hayes*
ATTORNEY

July 29, 1952        E. J. HAUBER        2,604,788
CLUTCH MECHANISM Filed Jan. 10, 1947        6 Sheets-Sheet 5

INVENTOR.
ERWIN J. HAUBER
BY
ATTORNEY

July 29, 1952

E. J. HAUBER 2,604,788

CLUTCH MECHANISM

Filed Jan. 10, 1947

INVENTOR.
ERWIN J. HAUBER
BY
*M. O. Hayes*
ATTORNEY

Patented July 29, 1952

2,604,788

UNITED STATES PATENT OFFICE 2,604,788

CLUTCH MECHANISM

Erwin J. Hauber, United States Navy

Application January 10, 1947, Serial No. 721,335

7 Claims. (Cl. 74—1)

(Granted under the act of March 3, 1883, as amended April 30, 1928; 370 O. G. 757)

This invention relates to improvements in clutch mechanisms.

The primary object is to provide clutch mechanism of simple and durable construction adapted to control rotation of a shaft.

Another object is to provide clutch mechanism operable responsive to the power of a rotating shaft.

A further object is to provide novel clutch mechanism wherein the power of a rotating shaft is utilized to move a clutch operator parallel to said shaft.

Another object is to provide novel clutch mechanism operable responsive to hydraulic power.

A further object is to provide clutch mechanism adapted selectively to effect engagement and disengagement of a driving shaft from a driven shaft.

Still another object is to provide clutch mechanism adapted selectively to effect forward and reverse rotation of a driven shaft.

Further objects and advantages of this invention, as well as its construction, arrangement and operation, will be apparent from the following description and claims in connection with the accompanying drawings, in which

In general, the invention utilizes the driving power of a rotating shaft to move a clutch operator parallel to said shaft. In a preferred embodiment of the invention, illustrated in Figs. 1 to 7, both inclusive, a power shaft is provided with a right-hand threaded portion and a left-hand threaded portion, and carries a housing adapted to move axially along said shaft and over said threaded portions. This housing carries a plurality of dogs, a selected dog or dogs being adapted to engage the right-hand threaded portion and a selected dog or dogs being adapted to engage the left-hand threaded portion. These dogs, mounted in said housing for movement at an angle to the longitudinal axis of the shaft, are each provided with a threaded portion adapted to mesh with a threaded portion of said shaft. A cam bar mounted on the said housing for movement parallel to the longitudinal axis of the shaft controls the engagement of the dogs with said shaft: In one position, the cam bar holds the dogs out of contact with said shaft. When movement of the operator is desired, the cam bar is moved, thus forcing one of the dogs into engagement with a threaded portion of the shaft. Rotation of said shaft then causes an axial movement of said dog and housing, which axial movement continues until said dog reaches the portion of the cam bar that releases it from engagement with the said shaft. A rack and pawl construction is provided to hold the clutch operator in position when the dog is released from the shaft.

In the modified form of the invention shown in Figs. 8–11, both inclusive, an auxiliary shaft is geared to the main shaft. Both said shafts are provided with threaded portions, said respective threaded portions having a common pitch. A housing is mounted on said shafts, said housing being adapted for movement parallel to the longitudinal axes of said shafts. Said housing carries a dog adapted to engage either the main shaft or the auxiliary shaft. Hydraulic power controlled by a piston valve is employed to lock the clutch operator in adjusted position.

In the preferred embodiment of the invention shown in Figs. 1–7, both inclusive, the clutch operator comprises a cylindrical sleeve 10 mounted slidably upon a power shaft 11. Said power shaft is coupled to a source of motive power, such as an internal combustion engine (not shown).

Figures 1, 6, 7:
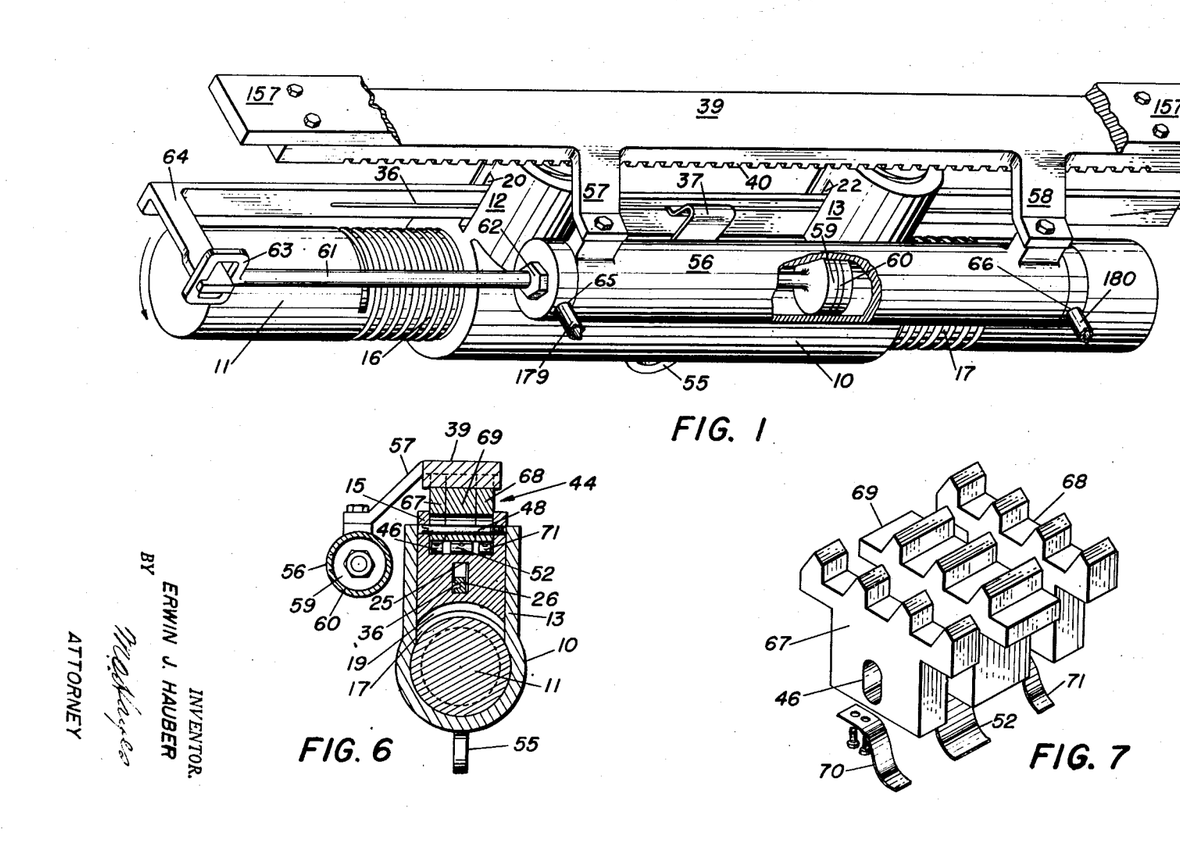
Fig. 1 is an isometric view of a clutch mechanism, partly cut away, showing a preferred embodiment of the invention.
Fig. 6 is a section taken on the line 6—6 of Fig. 2.
Fig. 7 is an exploded isometric view of a pawl thereof, showing the staggered arrangement of the teeth of said pawl.
Figure 2:
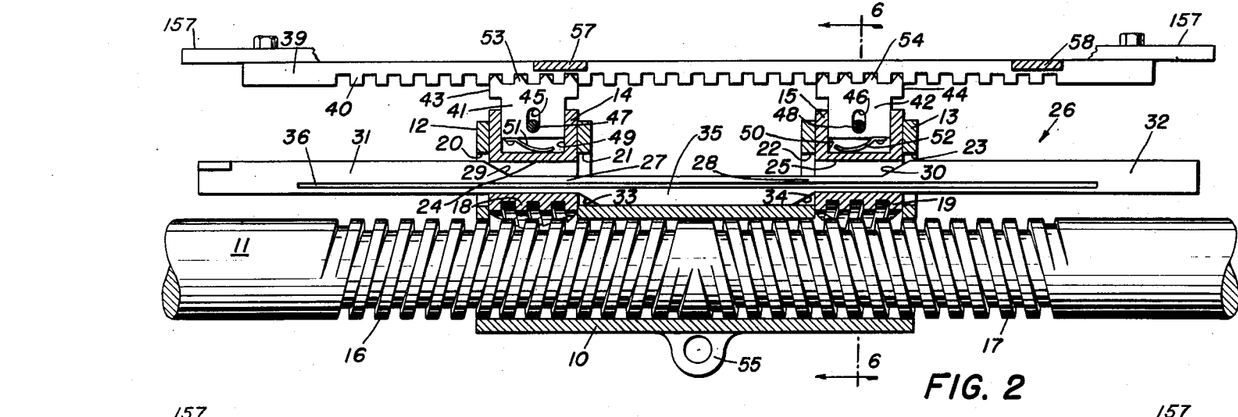
Fig. 2 is a longitudinal elevation thereof, partly cut away.
Figure 3:
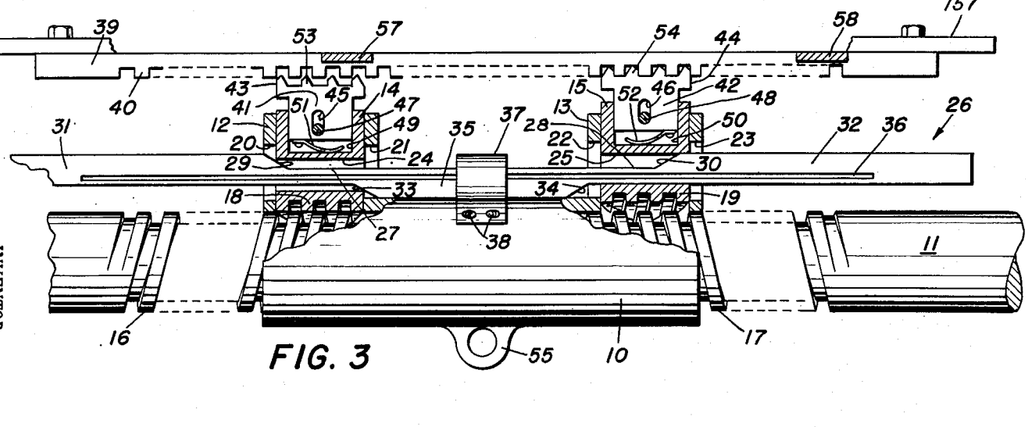
Figs. 3, 4 and 5 are longitudinal elevations of a portion thereof, partly cut away, showing the relative positions of components at different stages of the operation.
Figure 4:
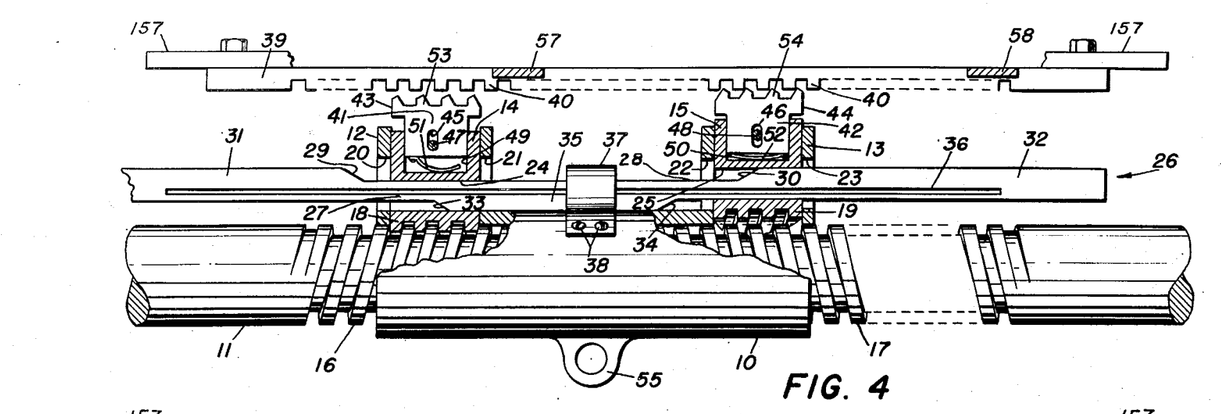
Figure 5:
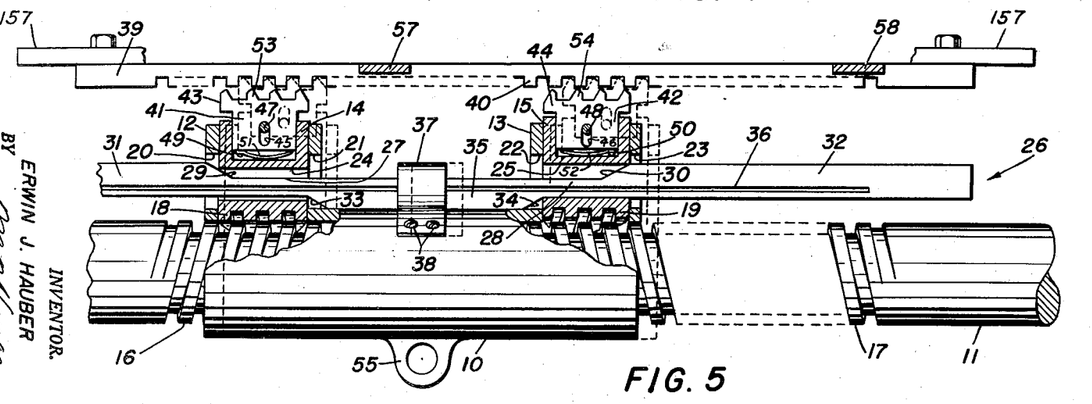

One portion of the power shaft 11 is provided with left-hand threads 16 and another portion of said shaft is provided with right-hand threads 17. (While square threads have been shown, any type of thread can be employed.) The sleeve 10 is free to slide along the shaft 11 and over the threaded portions thereof, and does not rotate with said shaft. A plurality of cylindrical bosses 12 and 13, which are formed integral said sleeve 10, are provided with an axial bore and project from spaced positions on the periphery of said sleeve to carry the dogs and cam bar hereinafter described. A plurality of dogs 14 and 15 are each cylindrical in form and fit slidably within the bores of the bosses 12 and 13 respectively. Faces of the dogs 14 and 15 are provided with teeth 18 and 19 respectively, said teeth being cut to mesh with the shaft threaded portions 16 and 17 respectively.

The boss 12 is provided with longitudinal apertures or slots 20 and 21, one on each side thereof, the plane of said slots being radial the axis of the sleeve 10. The boss 13 is provided with correspondingly disposed longitudinal apertures or slots 22 and 23. The dogs 14 and 15 are provided with transverse slots 24 and 25 respectively. Said slots 24 and 25 are adapted to be aligned with the slots in the bosses in which they are mounted so as to carry a cam bar 26.

Said cam bar 26 extends through the slots of the bosses and dogs, preventing rotation of the dogs in their respective bosses, while permitting movement of said dogs parallel to the longitudinal axis of their respective bosses. The dimensions of said cam bar are such that said bar holds both of the dogs out of contact with the shaft 11 when the sleeve 10 is in a selected position and forces the face of one of the two dogs to mesh with a threaded portion of the shaft while locking the other dog out of engagement with said shaft, the direction of movement of the sleeve 10 determining whether the face of the dog 14 or of the dog 15 will engage the shaft 11.

Said cam bar 26 is preferably flat and of uniform thickness, to facilitate the slidable fit of said cam bar in the slots in the bosses and dogs. Said cam bar is approximately twice the length of the sleeve 10, and its maximum width is somewhat less than the height of the slots 24 and 25. Said cam bar 26 is of reduced width at two intermediate portions 27 and 28, said portions being spaced a distance approximately equal to the spacing of the bosses 12 and 13, the length of each such portion being somewhat less than the diameter of the dogs 14 and 15. Cam surfaces 29 and 30 project from an edge of the intermediate portion 27 and from an edge of the intermediate portion 28, respectively, to make the ends 31 and 32 of said cam bar of greater width than the intermediate portion thereof. The opposite edges of the adjacent ends of the narrow intermediate portions are provided with cam surfaces 33 and 34 so that the center portion 35 of said cam bar is the same width as the ends 31 and 32 and said center portion is offset from said ends. The cam bar 26 is provided with a groove 36 longitudinal a side thereof and extending somewhat less than the length of said bar. A leaf spring 37 secured to the sleeve 10 by any suitable means, such as screws 38, has its end distal said sleeve riding in the groove 36. The spring 37 is so tensioned as to hold the cam bar 26 against the sleeve 10 while permitting the said bar to slide relative said spring.

A rack 39 secured to a stationary member 157 holds the sleeve 10 in operable position. Said rack 39 is disposed parallel to the longitudinal axis of the shaft 11, proximate the threaded portions of said shaft. Teeth 40 transverse the face of said rack adjacent the cam bar 26 are disposed along said face a distance corresponding to the length of the threaded portions of the shaft 11. The dogs 14 and 15 are provided with rectangular recesses 49 and 50 respectively in the ends of said dogs distal the shaft 11, said recesses being disposed over the slots 24 and 25 respectively. Mounted slidably for reciprocable movement in these recesses are the rectangular stems 41 and 42 of pawls 43 and 44 respectively. These stems are provided with transverse elongated apertures 45 and 46 respectively, and retaining pins 47 and 48 span the recesses 49 and 50 respectively, passing through said apertures and having their ends retained in suitable apertures in the dogs, one end of each pin being threaded and one aperture in each dog being tapped to receive said threaded end. These pins limit the vertical movement of the pawls with respect to the dogs.

Leaf springs 51 and 52 are secured to the underside of the pawls 43 and 44 respectivly. Said leaf springs bear against the bottom of the recesses 49 and 50 respectively and serve to force the pawls out of their seats in the recesses in the dogs and into engagement with the rack 39. The distal ends of the pawls 43 and 44 are provided with transverse teeth 53 and 54 respectively. These teeth have one sloping side and one vertical side, which is beveled at the top, so that the pawl is adapted to slide in one direction relative the rack but cannot slide relative the rack in the opposite direction. The teeth of one pawl are adapted to slide in one direction relative the rack and the teeth of the other pawl are adapted to slide in the opposite direction relative said rack, the respective vertical sides of said teeth facing in the direction in which the sleeve will move when the dog on which it is mounted engages the shaft.

An eye 55 is cast integral with the sleeve 10 and serves to connect said sleeve with the device that it operates.

A hydraulic cylinder 56 is provided for moving the cam bar 26. This cylinder is disposed adjacent the bosses 12 and 13, with its longitudinal axis parallel to the longitudinal axis of the shaft 11. Arms 57 and 58 integral with the rack 39 secure said cylinder 56 to said rack. A piston 59, having a piston ring 60, is attached to an end of a piston rod 61 for operation in the cylinder 56. Said piston rod 61 projects through a packing gland 62 in one end of the cylinder and a rectangular eye 63 on the other end of the rod 61 engages an arm 64 secured at an angle to the end of the cam bar 26. Fluid for operating the piston 59 is supplied through suitable conduits 179 and 180 to ports 65 and 66 respectively, which are disposed at opposite ends of the cylinder 56. Movement of the piston responsive to said fluid will therefore effect a corresponding movement of the cam bar 26 with respect to the sleeve 10.

The operation of the device described above is as follows: When the shaft 11 is rotating in the direction indicated by the arrow in Fig. 1, the cam bar 26 is so positioned that dogs 14 and 15 are out of engagement with the shaft 11 and the pawls 43 and 44 are engaged with the rack 39 so as to prevent any movement of the sleeve. When the piston in the hydraulic cylinder is moved in one direction by the force of the fluid, the cam bar 26 is moved in the same direction. The cam surface 33 then engages the lower edge of the slot 24 in the dog 14, forcing it to assume a position wherein the dog teeth 18 engage the left-hand threads 16 of the shaft 11. This movement of the dog 14 also pulls the pawl 43 out of locking engagement with the rack 39, since the beveled top of the teeth will slide under the teeth 40 of the said rack. This movement of the cam bar 26 causes its wide end 32 to move into slot 25 to prevent the dog 15 from engaging the teeth 17 and to keep the pawl 44 engaged with the rack 39, thereby preventing movement of the sleeve 10 in the direction opposite that above indicated.

Further movement of the cam bar 26 in the direction above indicated forces the dog teeth 18 into mesh with the left-hand threads 16 and further lowers the pawl 43 so that it is completely out of contact with the rack 39. The wide center portion 35 of the cam bar enters the slot 24 to lock the dog 14 into engagement with the shaft 11. If the crests of the dog teeth 18 are not aligned with the adjacent roots of the left-hand threads 16 when the cam bar 26 is forced into the slot 24, the leaf spring 37 permits the said bar to ride up in the slots 20 and 21 of the boss 12 until the shaft 11 rotates to a position where the teeth will mesh. When such position is reached, the leaf spring 37 forces both the cam bar 26 and the dog 14 downward. Vertical movement of the cam bar 26 with respect to the piston rod 61 is effected by means of the rectangular eye 63 on the end of the piston rod, which permits vertical play of the arm 64 of the cam bar 26.

The cam bar 26 is held stationary in the position to which it has been moved by piston 59 and the sleeve 10 moves in the direction above indicated, the dogs 14 and 15, sleeve 10 and leaf spring 37 all sliding along the cam bar 26. This movement of the sleeve causes the sloping side of the pawl teeth 54 to engage teeth 40 of the rack 39, forcing the pawl 44 down into the rectangular recess 50 of the dog 15 and compressing the leaf spring 52. As soon as the pawl teeth 54 clear the teeth 40, the spring 52 forces them into engagement again.

The sleeve 10 continues to move in the same direction until the leading edge of the slot 24 in the dog 14 engages the cam surface 29, pulling the dog teeth 18 out of engagement with the left-hand threads 16 of the shaft 11 and raising the pawl 43 into contact with the rack 39. As the dog 14 moves on the cam surface 29, the slot 24 moves away from the wide center portion 35 of the cam bar 26. Should the dog teeth 18 be released from the left-hand threaded portion 16 of the shaft by the cam bar 26 when the pawl teeth are not in mesh with the teeth 40 of the rack 39, the pawls 43 and 44 are forced down into their respective recesses 49 and 50 against leaf springs 51 and 52 respectively. The force against which the sleeve 10 is moving will then cause the sleeve to drop back a sufficient distance to permit the pawls to mesh with the rack 39. At such time, the pawl 44 will prevent further movement of the sleeve. This final position is shown in broken lines in Fig. 5.

There is sufficient play between the cam surface 33 and the adjacent edge of the slot 24 of dog 14 to permit the amount of slip of the sleeve necessary for the pawls to mesh with the rack without causing the slot 24 to engage the cam surface 33 to force the dog teeth into engagement with the left-hand threads 16.

The maximum distance the sleeve can slip back because of the failure of the teeth on the pawls to mesh with those of the rack is equal to the pitch of such teeth. For purposes of illustration, this slip is exaggerated in the drawings: In practice, this slip is reduced to a negligible amount by using teeth of a much smaller pitch. The slip can also be reduced by providing the pawls with staggered teeth, as shown in Fig. 7. In such construction, each pawl is made in a plurality of sections, with teeth of the outer sections 67 and 68 disposed commonly while the teeth of a medial section 69 are spaced intermediate the teeth of the outer sections. Each section is provided with leaf springs 70, 52 and 71 respectively, one end of each such spring being affixed suitably to the bottom end of its section. This arrangement reduces the maximum slip in half, as it causes one set of teeth to mesh upon movement of the sleeve equivalent to one half of the pitch of the teeth. This type of construction can, of course, be modified to provide for teeth spaced at other degrees of relative stagger.

Movement of the sleeve 10 in a direction opposite to that hereinabove described at length is effected by moving the cam bar 26 in said opposite direction. Then the dog teeth 19 engage the right-hand threads 17 of the shaft 11 and the dog 14 is locked out of engagement with the shaft 11. The device then operates in the manner described above.

The depth of the threads on the shaft 11 decreases at the outer ends of each threaded portion until the roots of such threads merge with the surface of the shaft. This permits the dog meshing with the threaded shaft to ride out of mesh as it approaches the end of the threaded portion without damaging the device in the event that cam bar 26 is displaced accidentally a greater distance than that for which it is designed. As the dog rises, it forces the cam bar 26 up in the slots in the bosses against the pressure of leaf spring 37.

When one of the dogs engages the shaft 11, there is some tendency for the sleeve to rotate with the shaft, because of the friction between the several parts of the device and said shaft. But rotation of the sleeve is prevented by reason of the fact that the cam bar 26 is attached to the piston rod, which is prevented from rotating because the cylinder 56 is fixed in position. However, if the tendency for the sleeve 10 to rotate is sufficiently great, some additional means for preventing such rotation can be provided. For example, the eye 55, or some equivalent structure, can operate in a slot on some adjacent stationary member (not shown).

The modification illustrated in Figs. 8 to 11, both inclusive, employs a hydraulic cylinder and piston to lock the device in any adjusted position and a different means for taking power from the drive shaft.

Figure 8:
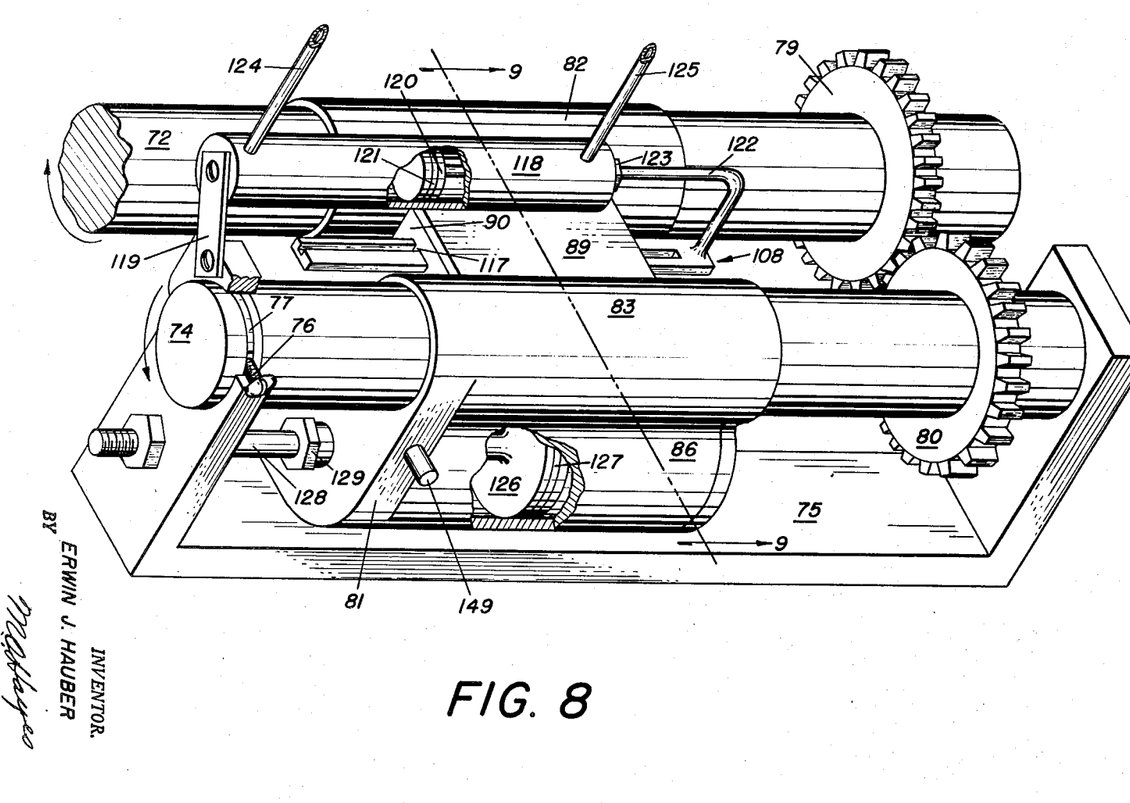
Fig. 8 is an isometric view of a modified form of the invention, partly cut away.

The power-driven shaft 72 has threads 73 along a portion of the length thereof. A back shaft 74 disposed parallel to shaft 72 and carried proximate thereto is journaled in a bracket 75 adapted to be affixed to some stationary member. A screw 76 in a tapped aperture in said bracket adjacent the shaft 74 projects into a peripheral groove 77 cut into the shaft 74, thus preventing movement of said shaft in the direction of its longitudinal axis. Shaft 74 is provided with threads 78 corresponding in pitch to the threads 73. The shafts 72 and 74 are coupled through gears 79 and 80, which have a ratio of 1:1, so that the shafts rotate at the same speed and in opposite directions. Said shafts support the housing 81, hereinafter described.

The housing 81 comprises sleeves 82 and 83 having cylindrical bores 84 and 85 respectively running the length of said sleeves and adapted to carry the shafts 72 and 74 rotatably therein. The housing also has a hydraulic cylinder 86 integral therewith and disposed below the sleeve 83. Walls joining the sleeve 82 and the cylinder 86 form a reservoir 87 (see Fig. 9) and the space between the sleeves is bridged by a wall 88 running the length of the housing. A cover plate 89 is secured above said space by webs 90 and 91. A lug 149 serves as a means for coupling the housing to the device to be operated.

The sleeves 82 and 83 are provided with apertures 92 and 93 respectively (see Fig. 10), said apertures being disposed in adjacent walls. These apertures face each other near the center of the sleeves and the aperture 92 is provided with vertical flanges 104 and 105, the aperture 93 having similar flanges 106 and 107. A dog 94 mounted in these apertures is guided by the flanges and is reciprocable relative the shafts. Said dog 94 is of a length permitting it to just clear each shaft when positioned therebetween. The end of the dog 94 adjacent shaft 72 is provided with teeth 95 adapted to mesh with the threads 73. The other end carries teeth 96 adapted to mesh with the threads 78 on the shaft 74. The dog is provided with a transverse rectangular opening 97 in which are mounted levers 98 and 99, said levers having fulcra 100 and 101 respectively. Said fulcra are disposed at points diagonal to each other and the free ends of said levers are adapted to extend in opposite directions within the opening 97. Leaf springs 102 and 103 are affixed to the respective levers and bear against the sides of the opening 97 to urge the free ends of the levers away from the sides of the opening and toward the center thereof.

Figure 10:
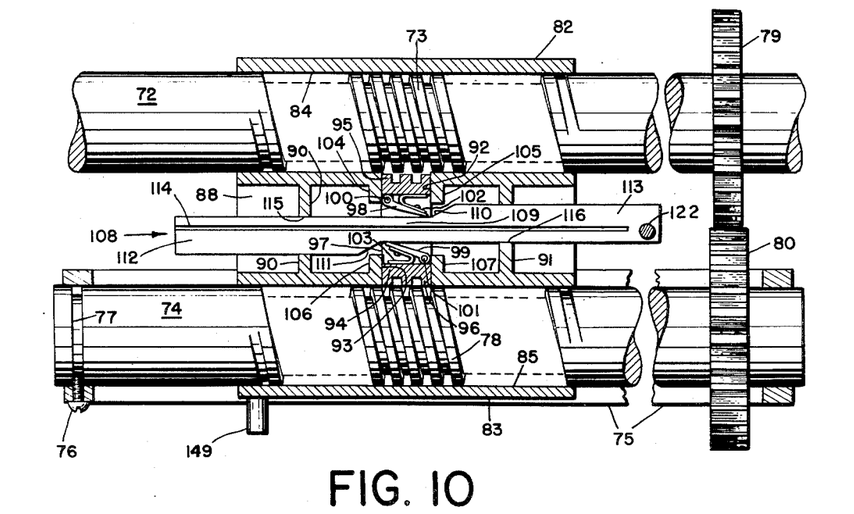
Fig. 10 is a section taken on the line 10—10 of Fig. 9.

A cam bar 108 adapted to operate the dog 94 comprises an elongated member of uniform thickness, rectangular in cross-section and having a center portion 109 of reduced width. The length of this portion 109 is slightly greater than the width of the dog 94. Cam surfaces 110 and 111 project from opposite edges of the center portion 109 to provide end portions 112 and 113 of increased width and offset with respect to each other. A groove 114 medial the face of the cam bar 108 extends substantially the length of said bar. The webs 90 and 91 are provided with apertures 115 and 116 respectively, said apertures having a configuration corresponding to the cross sections of the end portions 112 and 113 of the cam bar 108. Said bar is mounted slidably in the apertures 115 and 116 and is provided with keys 117 projecting into the groove 114 to prevent lateral displacement thereof.

The cam bar 108 projects through the opening 97 in the dog 94 and between the levers 98 and 99. The free ends of said levers bear against the opposite edges of said bar. When the center portion 109 of the bar is within the opening 97, the dog 94 is centered with respect to the shafts 72 and 74 and does not engage either.

A fixed hydraulic cylinder 118, secured to the bracket 75 by means of a bracket 119, is disposed in spaced relation to the cover plate 89 with its longitudinal axis parallel to the cam bar 108 and constitutes the means for moving said bar. A piston 120, provided with a piston ring 121 is positioned in said cylinder and affixed to a piston rod 122. The said piston rod is connected to the end of the cam bar 108, passing through a suitable packing gland 123 in the end of the cylinder. Conduits 124 and 125 connected to opposite ends of the cylinder supply fluid for actuating the piston.

The hydraulic cylinder 86 contains a piston 126 connected to a piston rod 128 that projects through the end of the cylinder and is secured in fixed position by being bolted to the bracket 75, as shown in Fig. 8. Said piston is provided with a piston ring 127 adapted to prevent bypassing of the hydraulic fluid. Said piston rod passes through a suitable packing gland 129.

Figure 9:
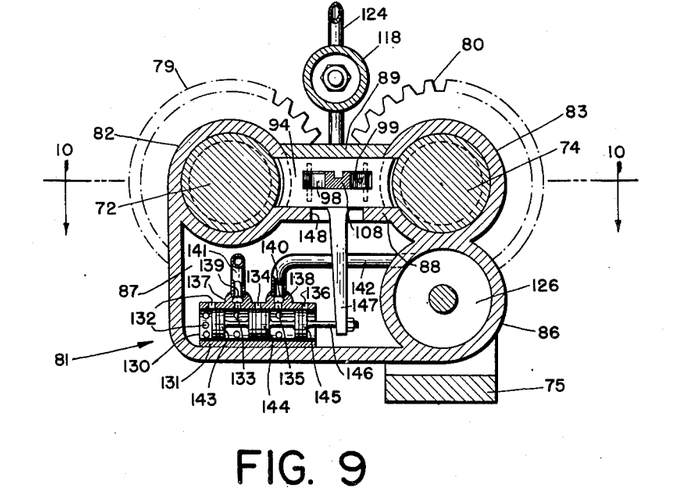
Fig. 9 is a section thereof, taken on the line 9—9 of Fig. 8.

As shown in Fig. 9, the flow of fluid into and out of the cylinder 86 is controlled by a piston valve 130 housed in the reservoir 87. This valve has a cylinder 131 provided with a plurality of circumferentially disposed sets of ports 132, 133, 134, 135 and 136, spaced along the length of said valve. Ports 133 and 135 connect respectively with collecting conduits 137 and 138 formed integral with the cylinder 131 and are provided with openings 139 and 140 for conduits 141 and 142 respectively. The pistons 143, 144 and 145, which control the ports, are mounted on a common piston rod 146 and move as a unit, and piston rings on each of the pistons serve to prevent fluid leakage. Piston 144 controls the flow of fluid through ports 134 and pistons 143 and 145 control the flow of fluid through ports 132 and 136 respectively.

It will be seen that when the valve is in the position shown in Fig. 9 no fluid can pass therethrough. However, when the pistons are moved in either direction from that position, ports 135 connect with ports 134 and ports 133 connect with ports 132, permitting a flow of fluid therethrough. Conduit 141 connects ports 133 to one end of the cylinder while conduit 142 connects ports 135 with the other end of said cylinder. The piston rod 146 is bolted to an end of a bar 147, the other end of said bar being secured rigidly to the center of the lower side of the dog 94. An aperture 148 in the wall 88 is of sufficient size to permit lateral movement of the bar 147 projecting therethrough. The reservoir 87 and the cylinder 86 are filled with a suitable fluid.

As shown in Figs. 8, 9 and 10, to effect movement of the housing 81, the cylinder 118 is energized by fluid under pressure supplied through conduit 124, which forces the piston 120 to move in one direction. As the cam bar 108 is affixed to the piston rod 122, it moves in the same direction, sliding in apertures 115 and 116. In this operation, the free ends of the lever 99 rides up the cam surface 111 and said lever rotates about the fulcrum 101 in a counter-clockwise direction, compressing the leaf spring 103. This causes the dog 94 to move the teeth 96 thereon into contact with the threads 78 on the shaft. If they do not mesh at once, the leaf spring 103 is further compressed, thereby increasing the force acting on the dog. As soon as the shaft rotates to a position at which said teeth and threads mesh, the leaf spring 103 forces said teeth and threads into engagement. The levers 98 and 99 are subjected to equal degrees of compression by their respective leaf springs 102 and 103, thereby positioning the dog 94 symmetricaly with respect to the end portion 112 of the cam bar 108. Since said end portion is offset towards the back shaft 74, the dog is retained in engagement therewith. This lateral movement of the dog also operates piston valve 130 through the bar 147 and piston rod 146 to move the pistons 143, 144 and 145 and to place ports 133 in communication with ports 134 and ports 135 in communication with ports 133. The housing then moves as the dog 94 slides along the cam bar 108 and the cylinder 86 slides over the piston 126. Fluid thereupon flows out of the end of the cylinder 86 through conduit 141, through ports 133 and out ports 134 to the reservoir. Similarly, fluid enters the other end of the cylinder 86 by flowing from the reservoir 87 through ports 136 and 135 and through conduit 142.

The dog continues to move along the cam bar 108 until it reaches the centre portion 109. At such time, the levers 98 and 99 disengage the dog 94 from the shaft and retain said dog in disengaged postion.

The operation of the device occurs substantialy as follows: When the power driven shaft 72 and the back shaft 74 coupled thereto are rotating in the direction indicated by the arrows in Fig. 8, and the dog 94 is not engaging either shaft, the levers 98 and 99 engage the center portion 109 of the cam bar 108 and serve to center said dog with respect to said shafts. The piston valve 130 is held by the bar 147 in such a position that the flow of fluid to and from the cylinder 86 is cut off, thereby locking the housing in position with respect to the piston and preventing movement thereof in an axial direction. In reaching such centered position, the dog 94 moves the piston valve 130 so as to close the ports and prevent any fluid from flowing into or out of the cylinder 86, thus locking said housing against any movement.

The movement of the housing in one direction is effected by moving the cam bar 108 in that direction to force the dog 94 into engagement with the power-driven shaft 72 and the piston valve is moved in the opposite direction, which permits a flow of fluid into and out of the cylinder 86. The operation of the parts will be substantially the same as that described above.

While a piston valve has been disclosed in the drawings, other types of valves can be employed for controlling the flow of fluid into and out of the cylinder. For example, simple petcocks, operable by the bar 147, can be attached to the ends of the conduit, or the ends of the conduits 141 and 142 can be connected to a petcock operable by the bar 147. In this latter means, the need for a reservoir 87 is avoided as the fluid in the cylinder 86 passes from one end thereof to the other through said conduits.

An advantage of the type of clutch operator shown in Figs. 8 to 11, both inclusive, is that it can be comparatively short in overall length, thus simplifying the task of installation and adapting it to use with marine motors. The hydraulic cylinder used to lock the housing in position when it is not being moved avoids the possibility of the slip encountered in the first-described device when the rack takes hold after release of the dog.

Figure 11:
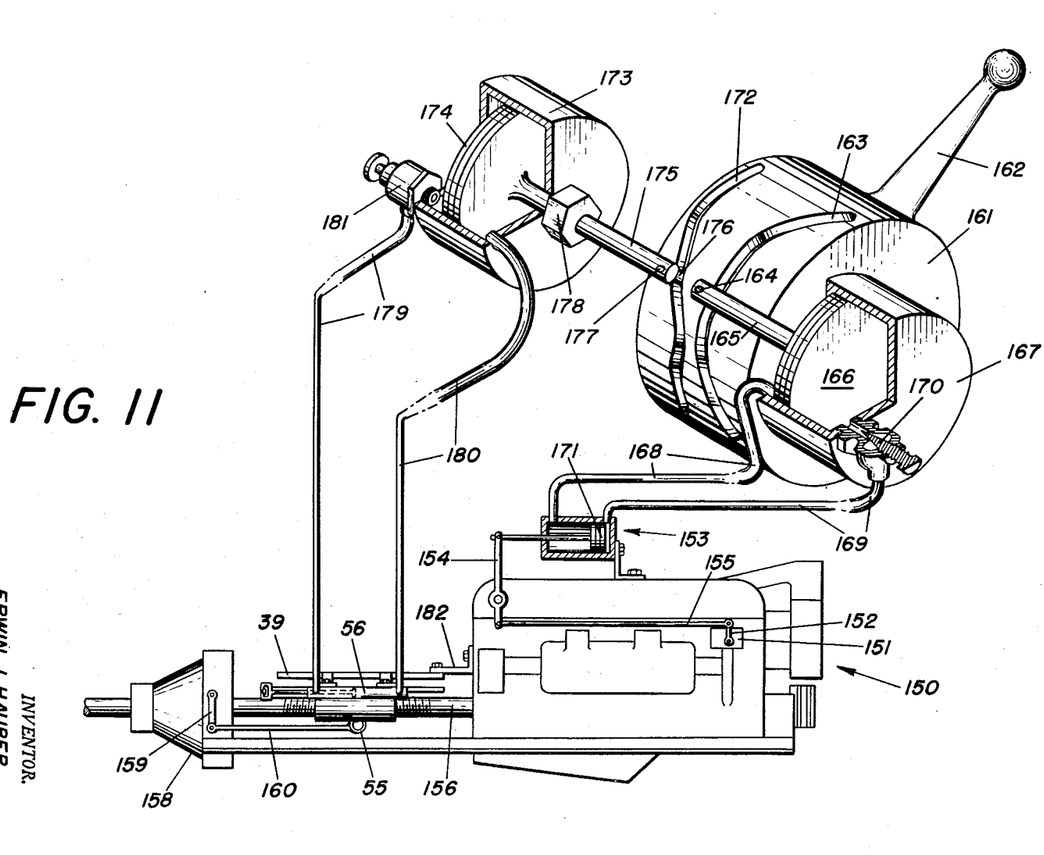
Fig. 11 is a composite view showing the controls, in isometric view, partly cut away, connected to a clutch operator mounted on a motor, which is shown in elevation.

Fig. 11 illustrates a combined motor control and clutch operator control system adapted to keep the motor speed relatively low while the clutch operator is activated and after operation of the clutch to permit the throttle to be operated while the clutch operator control is locked in position, in order to prevent any movement thereof while the throttle is being operated.

A motor 150 is provided with a throttle 151 having a lever 152 connected to the piston 171 of a hydraulic cylinder 153 through suitable linkages 154 and 155. Said cylinder 153 is affixed to a stationary part of the motor, as shown. The motor shaft 156 carries a clutch operator similar to that shown in Fig. 1, the rack 39 and cylinder 56 being fixed to a stationary part of the motor by bracket 182. The clutch housing 158 has a clutch lever 159 connected to the clutch operator by a link 160. The control member, which may be positioned remotely, comprises a drum 161 mounted suitably for rotation about its axis. (Said mounting is not shown in the drawings.) The drum 161 is provided with a handle 162 by which it is rotated, and the periphery of said drum has a throttle groove 163 cut therein. The medial portion of this groove parallels the ends of the drum while the end portions of said groove diverge towards an end of said drum. A piston rod 165 carries a roller bearing (not shown) on a pin 164 which projects into the groove 163. Said piston rod carries a piston 166 mounted for reciprocal movement in a hydraulic cylinder 167. Conduits 168 and 169 connect opposite ends of the cylinder 167 to opposite ends of the cylinder 153. A needle valve 170 is adapted to control the rate of flow of fluid from the cylinder 167 and hence controls the speed of operation thereof.

A clutch operator groove 172 is cut in the periphery of said drum, the medial portion thereof being helical in form and coextensive with the medial portion of groove 163. The end portions of the groove 172 parallel the ends of the drum and are coextensive with the end portions of the groove 163. A second hydraulic cylinder 173 is aligned axially with cylinder 167 and is provided with a piston 174. Said piston 174 is provided with a piston rod 175 and roller bearing 176 carried by pin 177 projecting into groove 172. Packing gland 178 is adapted to prevent leakage around the piston rod 175. The piston rod 165 is provided similarly with a packing gland. Conduits 179 and 180 connect the opposite ends of the cylinder 173 to opposite ends of the cylinder 56 of the clutch operator. A needle valve 181 is adapted to control the flow of fluid in the cylinder 173. All of the cylinders and conduits are filled with a suitable fluid.

In neutral position, when the clutch operator is inoperative, the roller bearing attached to the piston rod 165 is equidistant from the diverging portions of the groove and the piston rod 165 is held adjacent one end of the cylinder 165. The roller bearing 176 is positioned correspondingly in groove 172 equidistant from the ends of the medial portion of said groove and the piston 174 is held medial the cylinder 173. The control cylinder 153 has its piston adjacent the end thereof that is connected to the end of the cylinder 167 distal piston 166. This position of the throttle control piston corresponds to idling speed of the motor—movement to the left increases the motor speed. The piston in the control cylinder 56 is positioned centrally.

When it is desired to engage the clutch, the handle 162 is pushed in a clockwise direction to rotate the drum. As the roller on piston rod 165 operates in the medial portion of groove 163, the motor speed does not change during the first movement of the drum. Roller bearing 176, being in the helical portion of groove 172, moves the piston 174 to the left, forcing the fluid through conduit 179 into the left end of cylinder 56. This operates the clutch operator, in the manner hereinabove described, to engage the clutch mechanism through link 160 and clutch lever 159. Thus, the clutch operator functions when the motor 150 is running at low speed. Upon further rotation of the drum 161, the roller bearing 176 passes into the lower end of the groove 172. This change produces no further movement of the piston 174. At the same time, the helical portion of the groove 163 operates to move the piston 166 to the right, forcing fluid through conduit 169 to the right end of cylinder 153 to operate the piston 171 connected to the throttle, thereby increasing the speed. The greater the movement of the drum, the greater will be the speed, since movement of the piston 171 is proportional to the motor speed.

In stopping, the converse of the above procedure is followed: The drum is rotated counterclockwise to slow down the motor by means of the cylinder 167 and the piston 171 before causing the clutch operator to return to neutral or initial position under the influence of cylinders 173 and 56.

In reversing, substantially the same procedure is followed: The drum is rotated counterclockwise, causing piston 174 to move to the right and forcing fluid into the right end of cylinder 56, which actuates the clutch operator, moving the clutch to reverse position. During this operation, the motor is idling. Upon completion of the operation of the clutch and continued rotation of the drum, the speed of the motor is increased while the clutch operator is maintained in the position to which it has been moved. In stopping, the speed is reduced before the clutch operator is energized to move the clutch to neutral position.

The needle valves 181 and 170 control the rate of flow of the fluid from their respective cylinders and hence control the speed of operation of the system. As the pistons are not moved at the same time, needle valve 181, which controls the speed of operation of the clutch operator, can be set independently for a different rate of speed than the throttle controlled by valve 170.

Various modifications and changes can be made in the device without departing from the scope of the invention.

The invention described herein may be manufactured and used by or for the Government of the United States of America for governmental purposes without the payment of any royalties thereon or therefor.

I claim:

1. Mechanism comprising a rotatable shaft having right-hand threads and left-hand threads, means to rotate said shaft, linearly movable thread-engaging elements adapted respectively to engage said threads and a cam bar extending along the threaded portions of said shaft, said cam bar having a portion of reduced width and being thereby adapted to hold said elements out of contact with said threads at one time and to hold either but only one of said elements in contact with said threads at another time, said cam bar being adapted to move said one element out of contact with said threads and adapted to be motivated therefor by said one element moving with said threads for a predetermined distance.

2. Mechanism comprising a rotatable shaft having right-hand threads and left-hand threads, means to rotate said shaft, linearly movable thread-engaging elements adapted respectively to engage said threads and a cam bar extending along the threaded portions of said shaft, said cam bar having a portion of reduced width and being thereby adapted to hold said elements out of contact with said threads at one time and to hold either but only one of said elements in contact with said threads at another time, said cam bar being adapted to move said one element out of contact with said threads and adapted to be motivated therefor by said one element moving with said threads for a predetermined distance, and locking means operated by said cam bar at the end of said predetermined time to restrain said element against further linear motion.

3. Clutch-actuating mechanism comprising a shaft having right-hand and left-hand threaded portions, a housing movable axially thereon, thread-engaging elements adapted respectively to engage said threaded portions and controlled by a cam bar for movement parallel to said shaft so that said elements are held out of contact with said shaft by said cam bar in one position and so that one element engages said shaft in another position of said cam bar, so that rotation of said shaft causes axial movement of said element and housing until said element reaches a portion of said cam bar that releases it, a clutch operator actuated by said housing, and a rack and pawl adapted to hold said clutch operator in position when said element is released from said shaft.

4. Clutch-actuating mechanism comprising a shaft provided with a medially disposed left-hand threaded portion and an adjacent medially disposed right-hand threaded portion, the roots of said threads each decreasing from full depth at their adjacent ends to convergence with the periphery of said shaft, a cylindrical sleeve mounted slidably on said shaft and adapted to slide freely along the threaded portions thereof, a pair of spaced cylindrical bosses formed integral said sleeve and projecting therefrom, thread-engaging elements positioned slidably in axial bores of said bosses, said elements having toothed faces adapted to mesh with threaded portions of the shaft, slots in said bosses and elements being adapted to be aligned to carry a common cam bar, a cam bar extending through said slots adapted to retain said elements out of contact with said shaft and to effect contact of one of said elements with said shaft while retaining the other element out of contact therewith, a leaf spring secured to said sleeve having its end distal said sleeve riding in a medial longitudinal groove in said cam bar and adapted to hold said cam bar against said sleeve while permitting said bar to slide relative said spring, a rack parallel the longitudinal axis of said shaft secured to a stationary member, transversely disposed teeth on the face of said rack, pawls seated in said elements adapted for limited reciprocation therein radial said shaft, teeth on the faces of said pawls adapted to engage the teeth of said rack upon movement of the sleeve in one direction and to slide over the teeth of said rack upon movement of said sleeve in the opposite direction, means forcing said teeth against the teeth of said rack, and hydraulic means for moving said cam bar relative said sleeve.

5. Clutch-actuating mechanism comprising a shaft having a left-hand threaded portion and a right-hand threaded portion, a sleeve mounted slidably on said shaft for movement over the said threaded portions, a pair of bosses carried by said sleeve, each boss having an axial bore, thread-engaging elements positioned slidably in said bores, said elements having toothed faces adapted to mesh with said threaded portions, slots in said bosses and elements, a cam bar extending through said slots adapted to retain said elements out of contact with said shaft and to effect contact of one of said elements only with said shaft, a leaf spring secured to said sleeve and having its end distal said sleeve riding in a groove in said cam bar to hold said cam bar against said sleeve while permitting said bar to slide relative said spring, a rack having transverse teeth positioned parallel to said shaft and secured to a stationary member, pawls seated in said elements and reciprocable therein radial said shaft to engage the teeth of said rack upon movement of the sleeve in one direction and to slide over said teeth upon movement of said teeth in the opposite direction, means forcing said pawls against the teeth of said rack, and means to move said cam bar relative said sleeve.

6. Clutch-actuating mechanism comprising a shaft having left-hand and right-hand threaded portions, a sleeve mounted slidably on said shaft, a pair of bosses carried by said sleeve, each boss having a bore, thread-engaging elements positioned slidably in said bores and adapted to mesh with said threaded portions, slots in said bosses and elements, a cam bar extending through said slots and having enlarged portions adapted to move said elements into engagement with said threaded portions selectively, a spring carried between said sleeve and said cam bar and adapted to hold said cam bar against said sleeve while permitting said bar to slide relative said spring, a rack secured to a stationary member, pawls seated in said elements and reciprocable therein radial said shaft to engage said rack upon movement of the sleeve in one direction and to slide over said teeth upon movement of said teeth in the opposite direction, means forcing said pawls against the teeth of said rack, and means to move said cam bar relative said sleeve.

7. Clutch-actuating mechanism comprising a shaft having left-hand and right-hand threaded positions, the distal portions of the roots of said threads each decreasing to convergence with the periphery of said shaft, a sleeve mounted slidably on said shaft, a pair of bosses carried by said sleeve, each boss having a bore, thread-engaging elements positioned slidably in said bores and adapted to mesh with said threaded portions, slots in said bosses and elements, a cam bar extending through said slots and having enlarged portions adapted to move said elements into engagement with said threaded portions selectively, a spring carried between said sleeve and said cam bar and adapted to hold said cam bar against said sleeve while permitting said bar to slide relative said spring, a rack secured to a stationary member, pawls seated in said elements and reciprocable therein radial said shaft to engage said rack upon movement of the sleeve in one direction and to slide over said teeth upon movement of said teeth in the opposite direction, means forcing said pawls against the teeth of said rack, and means to move said cam bar relative of said sleeve.

ERWIN J. HAUBER.

REFERENCES CITED

The following references are of record in the file of this patent:

UNITED STATES PATENTS

| Number | Name | Date |
|---|---|---|
| 691,968 | Paine | Jan. 28, 1902 |
| 699,963 | Lines | May 13, 1902 |
| 929,520 | Truxal | July 27, 1909 |
| 1,134,085 | Kroeze | Mar. 30, 1915 |
| 1,310,752 | Hand | July 22, 1918 |
| 1,346,997 | Van Berkel | July 20, 1920 |
| 1,409,090 | Glasser | Mar. 7, 1922 |
| 1,421,163 | Burrows | June 27, 1922 |
| 2,082,679 | Brown | July 1, 1937 |
| 2,084,321 | Corradino | June 22, 1937 |
| 2,112,835 | Ekstromer | Apr. 5, 1938 |
| 2,226,591 | Swenson | Dec. 31, 1940 |
| 2,232,790 | Kress | Feb. 25, 1941 |
| 2,245,457 | Brassell | June 10, 1941 |
| 2,441,596 | Reitter | May 18, 1948 |